United States Patent
Tokita et al.

(10) Patent No.: US 7,031,620 B2
(45) Date of Patent: Apr. 18, 2006

(54) OPTICAL TRANSMISSION DEVICE AND OPTICAL TRANSMISSION SYSTEM USING THE SAME

(75) Inventors: Shigeru Tokita, Yokohama (JP); Mitsuo Akashi, Yokohama (JP); Naohiko Baba, Yokohama (JP); Yoichi Honzawa, Yokohama (JP); Hideki Satoh, Yokohama (JP)

(73) Assignee: OpNext Japan, Inc., Yokohama (JP)

( * ) Notice: Subject to any disclaimer, the term of this patent is extended or adjusted under 35 U.S.C. 154(b) by 754 days.

(21) Appl. No.: 09/905,045

(22) Filed: Jul. 12, 2001

(65) Prior Publication Data
US 2002/0061035 A1     May 23, 2002

(30) Foreign Application Priority Data
Sep. 20, 2000    (JP)   ............................ 2000-290330

(51) Int. Cl.
*H04B 10/04* (2006.01)
(52) U.S. Cl. ...................... 398/198; 398/182; 398/183; 398/186
(58) Field of Classification Search ................ 398/183, 398/185, 186, 187, 188, 198, 182
See application file for complete search history.

(56) References Cited

U.S. PATENT DOCUMENTS
5,343,324 A * 8/1994 Le et al. ..................... 398/198

FOREIGN PATENT DOCUMENTS
JP        2000-089178      3/2000

* cited by examiner

*Primary Examiner*—M. R. Sedighian
(74) *Attorney, Agent, or Firm*—Townsend and Townsend and Crew LLP (57) ABSTRACT

An optical transmission system includes a current source for outputting a drive current, a semiconductor laser for converting the drive current into a stimulated emission light and producing the same, a drive circuit for converting a transmission data signal into a modulation control signal and outputting the same, an optical modulator for receiving the stimulated emission light and a shading control signal for interrupting light emission and producing and outputting transmission signal light by changing an amount of transmission of the stimulated emission light according to the shading control signal, and a shading element for receiving the transmission signal light and a shading control signal for interrupting light emission and interrupting the transmission of the transmission signal light according to the shading control signal whereby an optical signal having wrong optical wavelength is rapidly prevented.

16 Claims, 8 Drawing Sheets

OPTICAL TRANSMISSION DEVICE AND OPTICAL TRANSMISSION SYSTEM USING THE SAME

BACKGROUND OF THE INVENTION

The present invention relates to an optical transmission system and more particularly to an optical transmission device adapted to an wavelength division multiplexing optical communication and an optical transmission system.

Since a wavelength division multiplexing optical transmission system is capable of realizing transmission of a large amount of data through one optical fiber cable, its demand has expanded rapidly. Further, as the amount of information increases, the number of channels for optical signals allotted to one optical fiber cable is expanded so that a high density is demanded for wavelength intervals between optical signals of adjacent channels.

The wavelength division multiplexing optical transmission system uses a plurality of optical transmission devices generating optical signals at prescribed optical wavelengths and an optical multiplexer for wavelength division multiplexing the optical signals. On the other hand, the wavelength division multiplexed optical signal is, after transmitted through an optical fiber cable, divided by an optical demultiplexer into respective prescribed optical wavelengths and converted in optical receivers to electrical signals.

A conventional optical transmission device used for such an optical transmission system is described in a publication of JP-A-2000-89178, for example.

Figure 11:
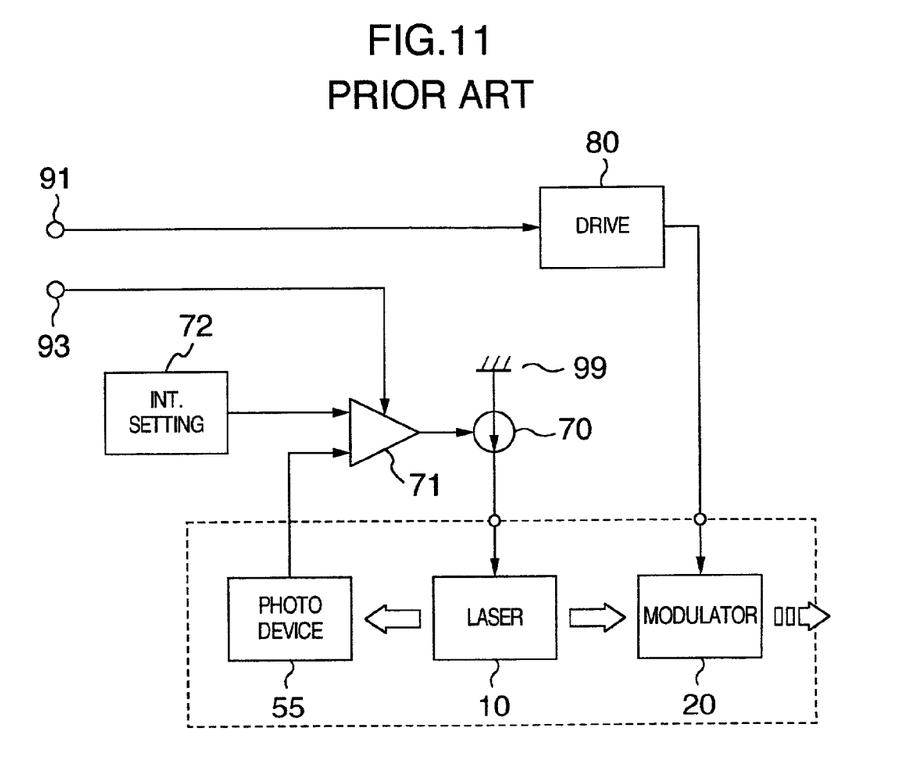
FIG. 11 shows a basic construction of a conventional optical transmission device.

FIG. 11 shows an arrangement of a conventional optical transmission device, which includes a semiconductor laser 10, an optical modulator 20, a drive circuit 80, a current source 70, a photo detector 55, an optical strength stabilization circuit 71 and an optical strength setting circuit 72. A stimulated emission light is generated by supplying a laser drive current from the current source 70 to the semiconductor laser 10. The stimulated emission light is modulated by the optical modulator 20 to be converted into an optical signal. In this case, the optical strength of the stimulated emission light is monitored by the photo detector 55. In the optical strength stabilization circuit 71, an optical strength setting signal produced by the optical strength setting circuit 72 is compared with an optical strength detection signal produced by the photo detector 55 and the laser drive current is controlled by according to the result of the comparison. As a result, the optical strength of the stimulated emission light is controlled to a constant level and the optical signal is produced at a predetermined optical strength.

Figure 9:
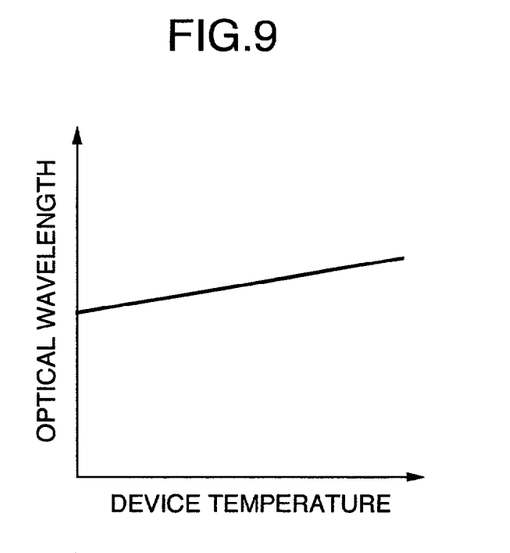
FIG. 9 shows an example of the relationship between an optical wavelength of a stimulated emission light in a distributed feedback laser diode used in an embodiment of the present invention.

In the conventional optical transmission device, the generation/interruption control of the optical signal is conducted by ON/OFF of the laser drive current. In the conventional optical transmission device, the element temperature is changed with variation of the power consumption of the semiconductor laser when the laser drive current is ON/OFF controlled. On the other hand, the semiconductor laser has characteristics such that the optical wavelength of the stimulated emission light varies depending on the element temperature of the semiconductor laser as shown in FIG. 9.

Therefore, when the conventional optical transmission device is applied to the wavelength division multiplexing optical transmission system, the optical wavelength of the optical signal varies in the ON/OFF control of the optical signal so that it is possible that the optical signal is interfered with the optical signal of adjacent optical wavelength channel thereby transmitting wrong optical signal.

SUMMARY OF THE INVENTION

An object of the present invention is to provide an optical transmission device capable of rapidly prevent an optical signal having wrong optical wavelength and also to provide an optical transmission system of less transmission error by using the optical transmission device of the present invention.

In order to achieve the above object, the optical transmission device comprises: a current source for outputting a drive current, a semiconductor laser for converting the drive current into a stimulated emission light and outputting the same, a drive circuit for converting a transmission data signal and a shading control signal for interrupting light emission into a modulation control signal and outputting the same, and an optical modulator for receiving a stimulated emission light and the modulation control signal and changing an amount of transmission of the stimulated emission light by the modulation control signal thereby generating transmission light signal.

Also, the optical transmission device comprises: a current source for outputting a drive current, a semiconductor laser for converting the drive current into a stimulated emission light and outputting the same, a drive circuit for converting a transmission data signal into a modulation control signal and generating outputting the same, an optical modulator for receiving the stimulated emission signal and a shading control signal for interrupting light emission and generating and outputting transmission signal light by changing an amount of transmission of the stimulated emission light by the shading control signal and a shading element for receiving the transmission signal light and a shading control signal for interrupting light emission and interrupting the transmission of the transmission signal light according to the shading control signal.

Further, the optical transmission device comprises: in addition to the above, a temperature detector for detecting a temperature of the semiconductor laser and producing and outputting a temperature detection signal, an optical wavelength setting circuit for generating and outputting an optical wavelength setting signal, an optical wavelength stabilization circuit for comparing the optical wavelength setting signal with the temperature detection signal thereby producing and outputting an optical wavelength control signal, an optical wavelength control means for controlling an optical wavelength of the semiconductor laser by the optical wavelength control signal, a shading judging circuit for judging a difference between the optical wavelength setting signal and the temperature detection signal thereby producing and outputting a shading judging signal, and an operator for receiving the shading setting signal and the shading judging signal thereby producing and outputting the shading control signal.

Further also, the optical transmission device comprises: in stead of the temperature detector, a monitor element for detecting an optical wavelength of a part of the stimulated emission light thereby producing the optical wavelength detection signal and outputting the same to the optical wavelength stabilization circuit and the shading judging circuit.

Still further, the optical transmission device, wherein the drive current of the current source is controlled by an optical strength control signal, comprises a photo detector for detecting an optical strength from a part of the stimulated emission light thereby producing and outputting an optical strength detection signal, an optical strength setting circuit for producing and outputting an optical strength setting signal and an optical strength stabilization circuit for comparing the optical strength setting signal with the optical strength detection signal thereby producing and outputting the optical strength control signal.

Still also, the optical transmission device, wherein the optical strength setting circuit receives an optical strength changing signal and produces the optical strength setting signal controlled by the optical strength changing signal and the optical wavelength setting circuit receives an optical wavelength changing signal and produces the optical wavelength setting signal controlled by the optical wavelength changing signal, comprises an external control interface circuit for receiving a control logic signal for controlling an optical strength, an optical wavelength and interruption and restoration of the transmission light signal, the optical strength detection signal and the optical wavelength detection signal and producing the optical strength changing signal, the optical wavelength changing signal and the shading setting signal.

Also, the optical transmission system comprises a plurality of the above-mentioned optical transmission devices of different wavelengths, an optical multiplexer for multiplexing the transmission light signals produced by the plurality of the optical transmission devices thereby producing an optical wavelength division multiplexing signal, an optical demultiplexer for dividing the optical wavelength division multiplexing signal into a plurality of receiving light signals of different wavelengths and a plurality of optical receivers for converting the receiving light signals into receiving electrical signals, respectively.

DESCRIPTION OF THE EMBODIMENTS

The present invention will be explained mainly with reference to FIGS. 1 to 7.

Figure 1:
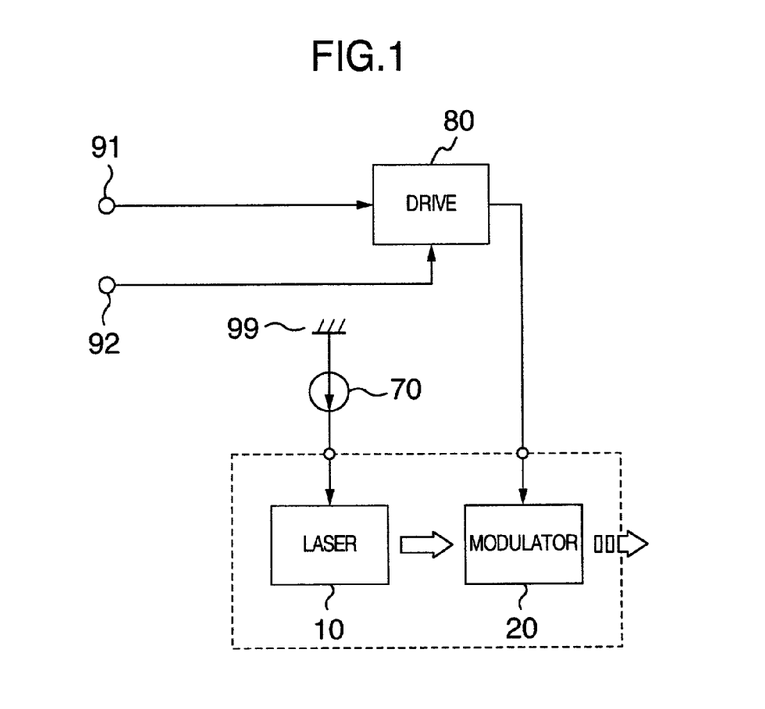
FIG. 1 shows a basic construction of an optical transmission device in a first embodiment of the present invention.

FIG. 1 shows a first embodiment of an optical transmission device according to the present invention. This optical transmission device includes a current source 70, a semiconductor laser 10, an optical modulator 20 and a drive circuit 80.

Figure 8:
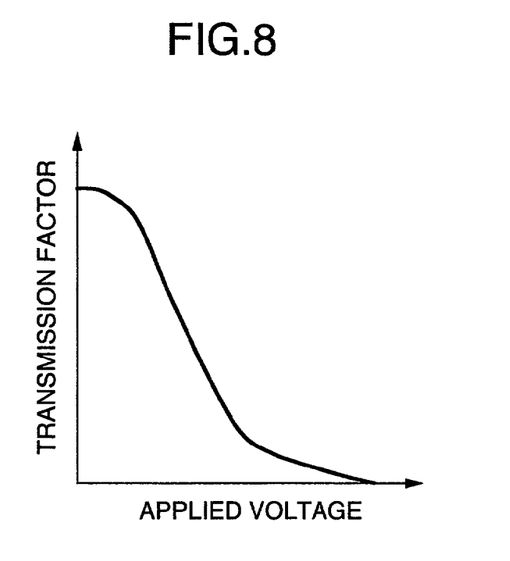
FIG. 8 shows an example of the relationship between a transmission factor and an applied voltage of an electro absorption optical modulator used in an embodiment of the present invention.

As the optical modulator 20, an electro absorption optical modulator element is used. According to a data signal inputted to the optical transmission device, the drive circuit 80 produces a modulation control signal of high level or low level. On the other hand, the electro absorption optical modulator element 20 has a relationship between a transmission factor and an applied voltage as shown in FIG. 8. In this embodiment, an optical signal is produced by changing the transmission factor of the electro absorption optical modulator element 20 depending on high or low level of the modulation control signal thereby changing the strength of the stimulated emission light.

On the other hand, when a shading control signal is inputted, the drive circuit 80 produces the modulation signal of low level independent of the data signal. Therefore, the shading of the optical signal is realized by inputting the shading control signal.

In the optical transmission device of this embodiment, the laser driving current is not changed in case of the generation/interruption control of the optical signal. Therefore, the element temperature of the semiconductor laser is kept constant so that the optical wavelength variation of the stimulated emission light and the optical signal can be suppressed.

Figure 2:
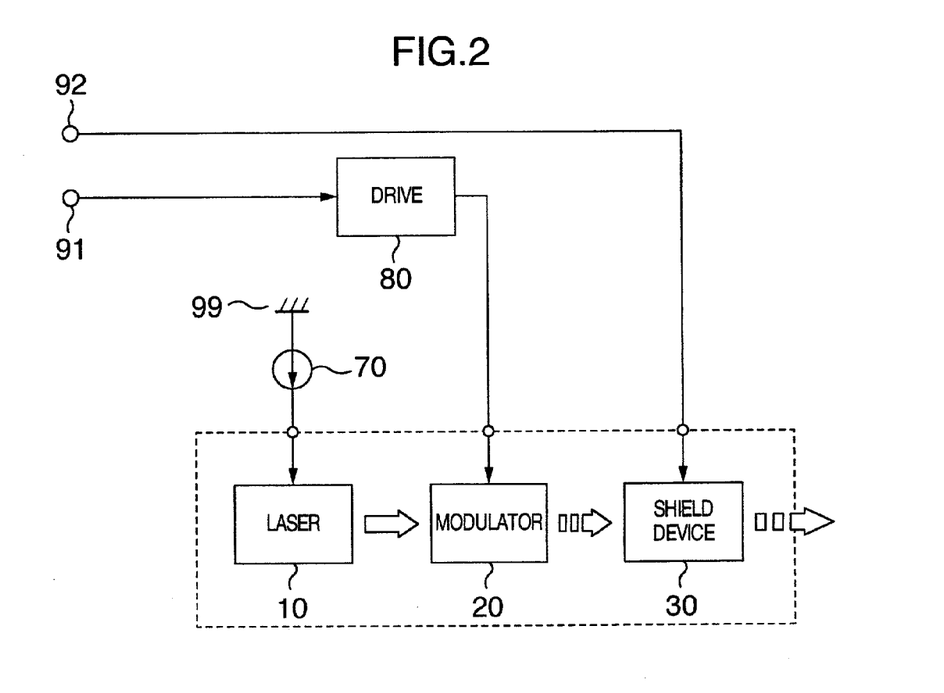
FIG. 2 shows a basic construction of an optical transmission device in a second embodiment of the present invention.

FIG. 2 shows a second embodiment of the optical transmission device according to the present invention. This optical transmission device includes a current source 70, a semiconductor laser 10, an optical modulator 20, a drive circuit 80 and a shading element 30. In this embodiment, when a shading control signal is inputted, the transmission factor of the shading element 30 is changed thereby shading the optical signal.

As the shading element 30, such an element is preferred in which the effect of the thermal variation applied to the semiconductor laser 10 is as small as possible in case of the generation/interruption control of the optical signal. Usually, an electro absorption optical modulator element or an optical shutter is used.

In this embodiment, the shading element 30 is provided independently of the optical modulator 20. Therefore, even when the semiconductor laser 10 is integrated in one chip of semiconductor element together with the optical modulator 20 so that the semiconductor laser and the optical modulator are necessarily thermally coupled, it is possible to realize an optical transmission device in which the semiconductor element 10 is not subjected to thermal disturbance in case of generation/interruption control of the optical signal.

Figure 3:
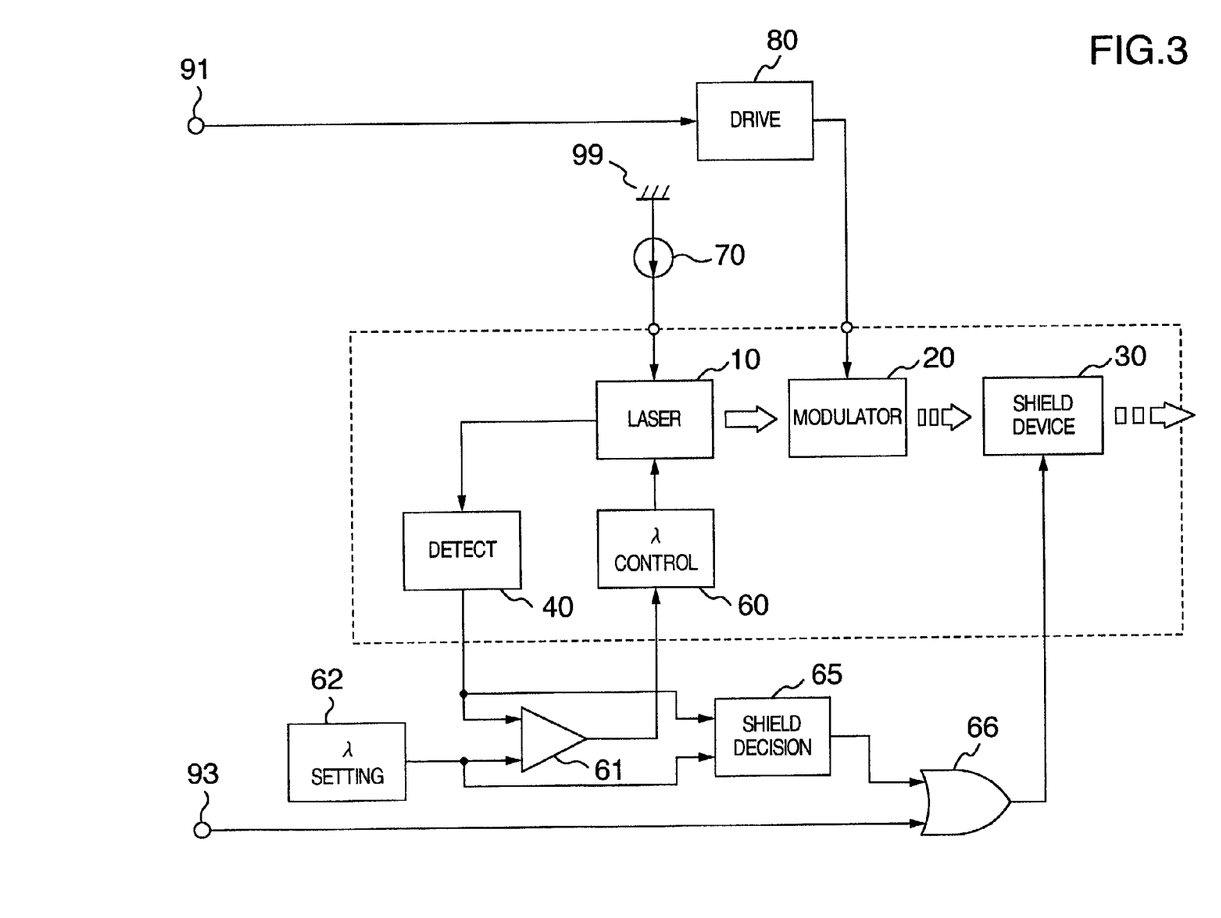
FIG. 3 shows a basic construction of an optical transmission device in a third embodiment of the present invention.

FIG. 3 shows a third embodiment of the optical transmission device according to the present invention. In addition to the optical transmission device as shown in FIG. 2, the optical transmission device of this embodiment includes a temperature detector 40 for detecting the element temperature of the semiconductor laser, optical wavelength control unit 60 for controlling the wavelength of the stimulated emission light of the semiconductor laser, an optical wavelength setting circuit 62, an optical wavelength stabilization circuit 61, a shading judging circuit 65 and an operator 66. As the semiconductor laser 10 used in this embodiment, a distributed feedback laser diode is used in which the optical wavelength of the stimulated emission light is controlled by the element temperature. FIG. 9 shows an example of the element temperature dependency of the stimulated emission light in the distributed feedback laser diode. Further, the optical wavelength control unit 60 is comprised of a Peltier current control circuit and a Peltier element.

The optical transmission device shown in the above embodiment is capable, with the above arrangement, of keeping the element temperature of the semiconductor laser 10 constant. That is, it is capable of transmitting the optical signal at a stabilized optical wavelength independently of the ambient temperature outside the optical transmission device. Further, when the element temperature of the semiconductor laser 10 is detected and the element temperature of the semiconductor laser 10 exceeds the setting value of the wavelength setting circuit 62 by more than a predetermined error, the shading judging is carried out to interrupt the optical signal by the shading element 30. Therefore, it is possible to realize an optical transmission device in which the transmission of optical signal is prevented during a period of time when the element temperature of the semiconductor laser 10 is lower than a setting value at unstable condition of the optical transmission device (for example, just after throwing-in of the electric power), thereby inhibiting the generation of an optical signal having wrong wavelength.

On the other hand, the embodiment of FIG. 3 performs a feedback control for the element temperature. Therefore, when the semiconductor laser 10 varies its optical wavelength with its ageing independently of the element temperature, it is difficult for the optical transmission device of the embodiment of FIG. 3 to stabilize the optical wavelength.

Figure 4:
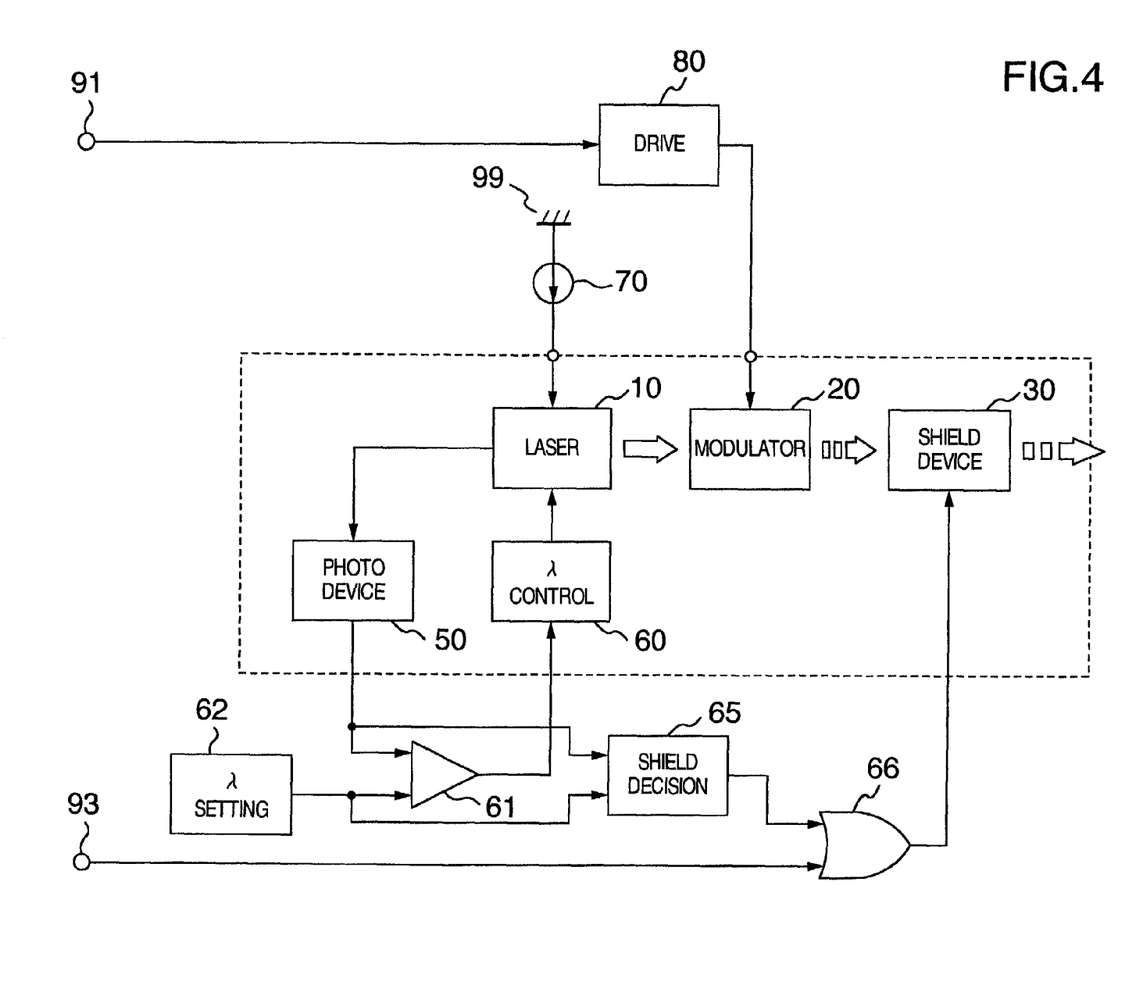
FIG. 4 shows a basic construction of an optical transmission device in a fourth embodiment of the present invention.
Figure 10:
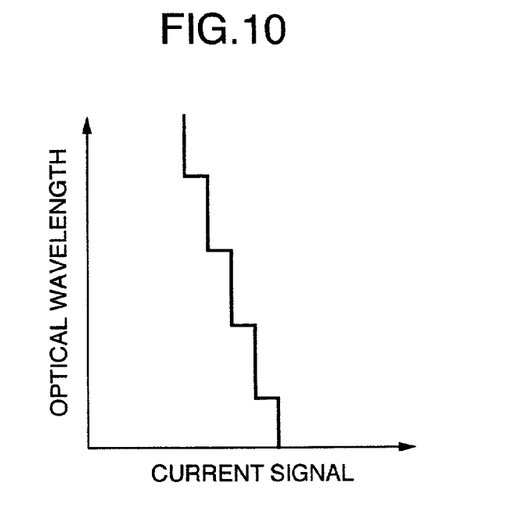
FIG. 10 shows an example of the relationship between an optical wavelength of a stimulated emission light in a distributed Bragg reflector laser diode used in an embodiment of the present invention.

FIG. 4 shows a fourth embodiment of the optical transmission device according to the present invention as an optical transmission device in which the variation of the optical wavelength due to ageing of the semiconductor laser 10 is suppressed. This embodiment is an optical transmission device including, in addition to the optical transmission device shown in FIG. 2, a photo detector 50 operating as a monitor element for detecting an optical wavelength from a part of the stimulated emission light, optical wavelength control unit 60 for controlling the optical wavelength of the stimulated emission light, an optical wavelength setting circuit 62, an optical wavelength stabilization circuit 61, a shading judging circuit 65 and an operator 66. As the semiconductor laser 10 used in this embodiment, a distributed Bragg reflector laser diode is used in which the optical wavelength of the stimulated emission light can be controlled by the element temperature and the current signal. FIG. 10 shows one example of the current signal dependency of the wavelength of the stimulated emission light for the distributed Bragg reflector laser diode. Also, the optical wavelength control unit 60 is comprised of Peltier current control circuit and Peltier element.

With the above arrangement, the optical transmission device of this embodiment applies a feedback control to the optical wavelength of the stimulated emission light thereby keeping the optical wavelength of the optical signal constant. Thus, it is possible to realize an optical transmission device which is capable of stabilizing the optical wavelength of the optical signal for a long period of time, even when the stimulated emission light of the semiconductor laser varies due to ageing independently of the element temperature.

Further, when the optical wavelength of the stimulated emission light is detected and the optical wavelength exceeds a predetermined setting value determined by the optical wavelength setting circuit 62 by more than a predetermined error, the shading judging is carried out thereby to interrupt the optical signal by the shading element 30.

Therefore, it is possible to realize an optical transmission device in which the transmission of optical signal is prevented during a period of time when the optical wavelength of the optical signal exceeds a predetermined error at unstable condition of the optical transmission device (for example, just after throwing-in of the electric power), thereby inhibiting the generation of an optical signal having wrong wavelength.

Figure 5:
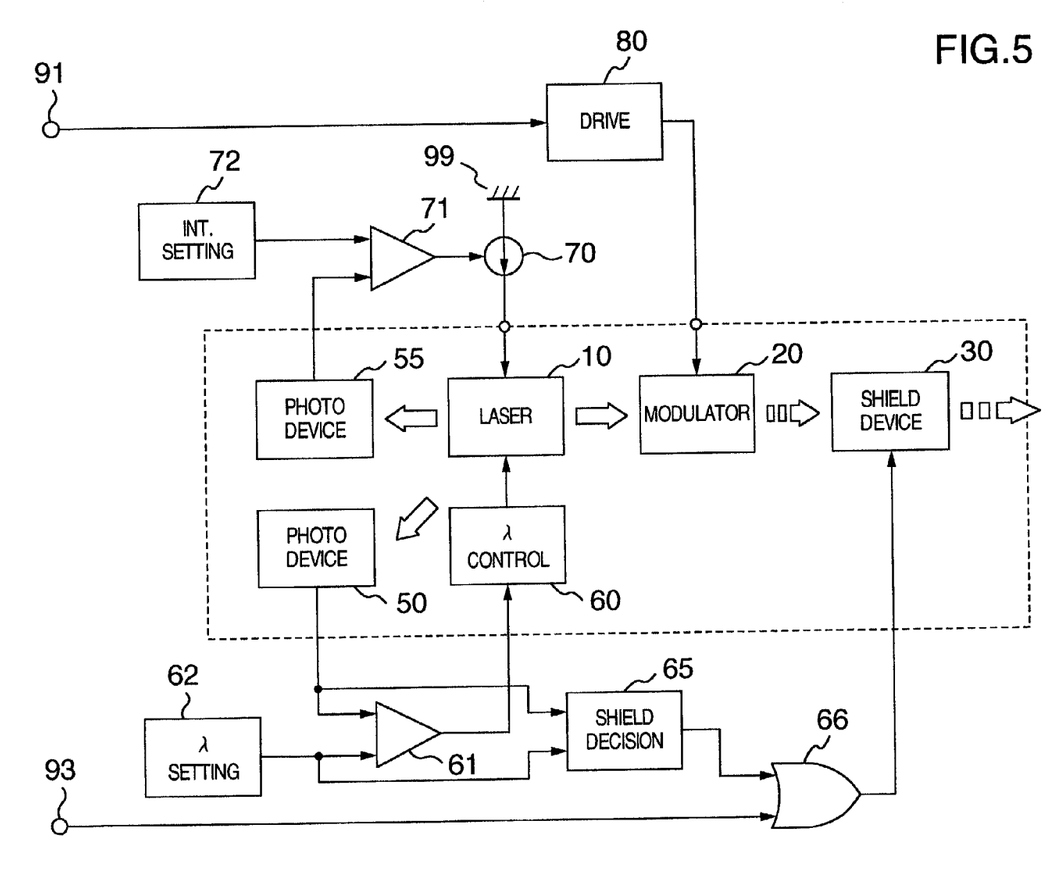
FIG. 5 shows a basic construction of an optical transmission device in a fifth embodiment of the present invention.

FIG. 5 shows a fifth embodiment of the optical transmission device according to the present invention. In addition to the optical transmission device as shown in FIG. 4, the optical transmission device of this embodiment includes a photo detector 55 for detecting an optical strength from a part of the stimulated emission light of the semiconductor laser 10, an optical strength setting circuit 72 and an optical strength stabilization circuit 71. In this embodiment, even when the radiation efficiency of the semiconductor laser 10 varies due to ageing, the optical strength of the stimulated emission light is kept constant by the feedback control. Thus, it is possible to obtain an optical transmission device which produces an optical signal having optical wavelength and amplitude stabilized for a long period of time and prevents transmission of optical signal at wrong optical wavelength.

Figure 6:
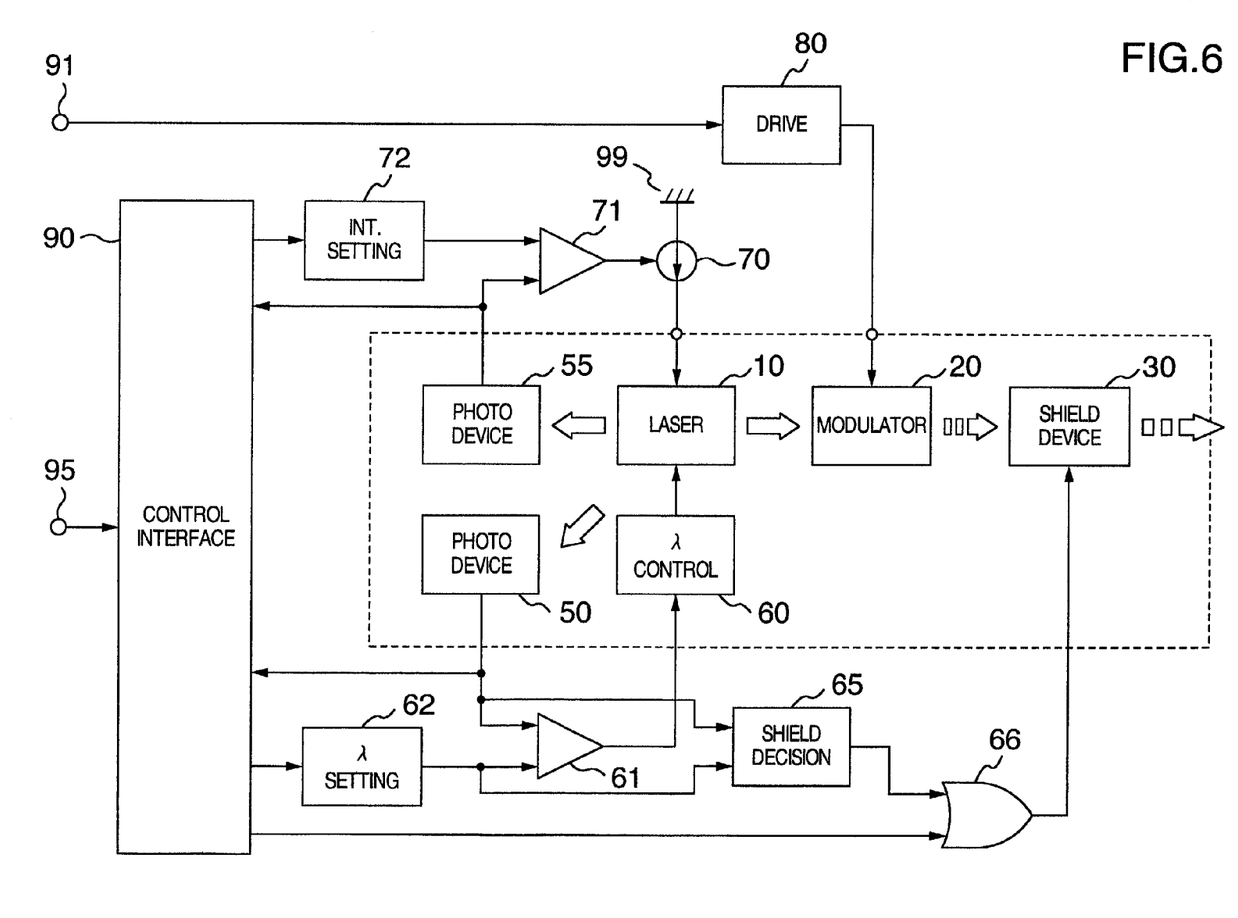
FIG. 6 shows a basic construction of an optical transmission device in a sixth embodiment of the present invention.

FIG. 6 shows a sixth embodiment of the optical transmission device according to the present invention. The optical transmission device of this embodiment includes, in addition to the optical transmission device shown in FIG. 5, a control interface circuit 90 for changing the settings of the optical strength and the optical wavelength and the shading setting in response to the control logic signal inputted to the optical transmission device. In this embodiment, it is possible to control in a lump the optical strength, the optical wavelength and the transmission/interruption state of the optical signal by an electric circuit provided externally of the optical transmission device. Further, it is possible to monitor the output signals of the photo detector (monitor element) 50 and the photo detector 55 and produce an alarm signal through the control interface circuit to an electric circuit provided outside the optical transmission device.

Further, when the optical strength or the optical wavelength transiently changes with variation of the control logic signal, the optical signal is shaded by the shading element so that the transmission of the optical signal of wrong optical strength or wrong optical wavelength is prevented.

Figure 7:
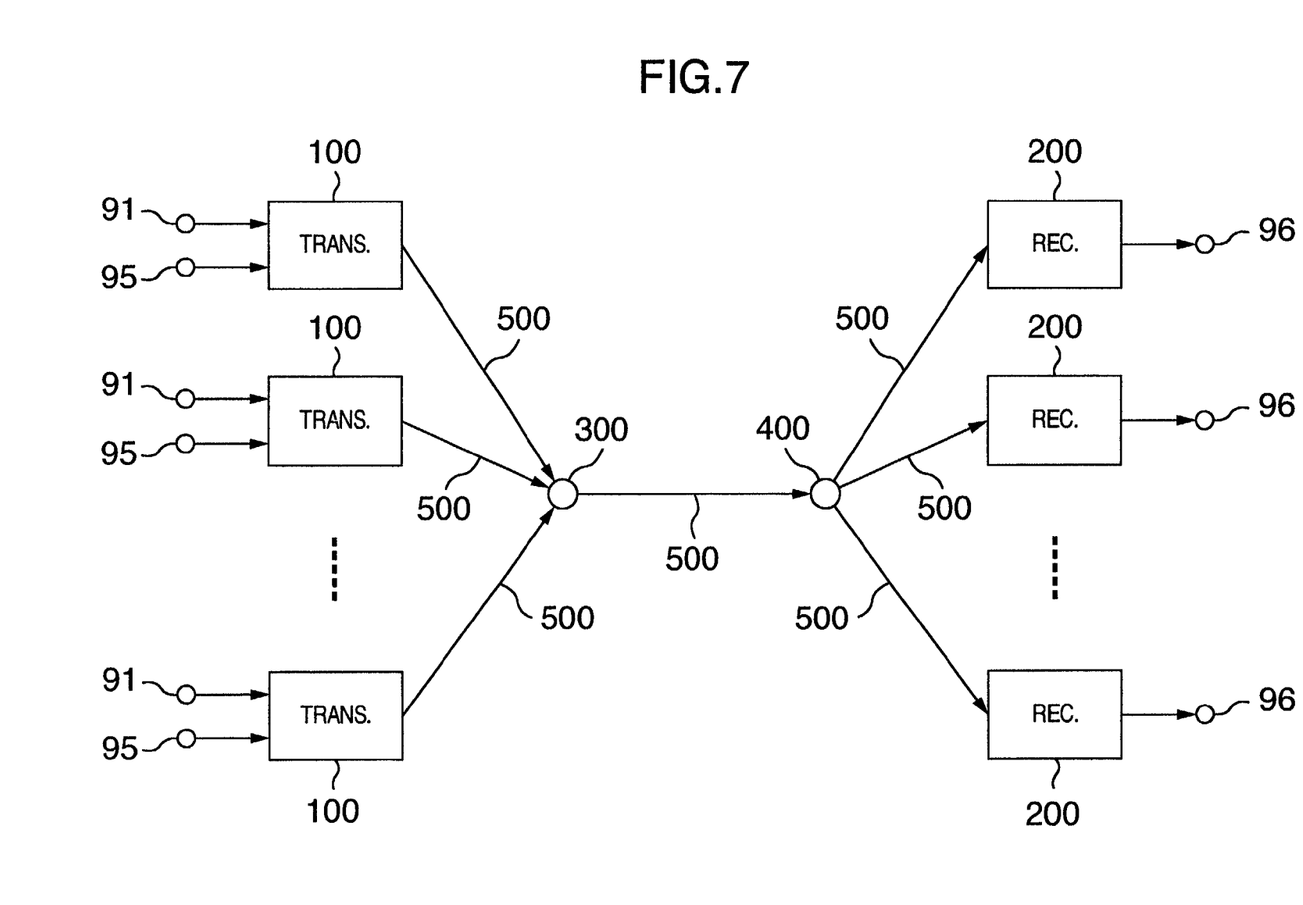
FIG. 7 shows a basic construction of an optical transmission system in an embodiment of the present invention.

With the above arrangement, an optical transmission device is obtained which is adaptable flexibly and rapidly to variation of the transmission distance or the optical wavelength in the optical transmission system. Further, an optical transmission device is realized by which the transmission/interruption control signal and the alarm signal are operated in a lump for two-way transmission to-and-from an electric circuit provided outside the optical transmission device. FIG. 7 shows an embodiment of an optical transmission system according to the present invention. The optical transmission system of this embodiment is comprised of an optical transmission device 100 as shown in any one of FIGS. 1, 2, 3, 4, 5 and 6, an optical multiplexer 300, an optical fiber cable 500, an optical demultiplexer 400 and an optical receiver 200. The optical transmission device 100 used in this embodiment prevents generation of an optical signal having wrong optical wavelength at transmission/interruption control of the optical signal and just after throwing-in of the system power source. Therefore, the optical transmission system of this embodiment generates no optical signal in a channel other than a predetermined optical wavelength channel and hence it is not interfered with an optical signal in an adjacent optical wavelength channel so that it is capable of realizing an optical transmission of less transmission error.

According to the present invention, it is possible to provide an optical transmission device which is capable of rapidly preventing generation of optical signal having wrong optical wavelength at transmission/interruption control of the optical signal and just after throwing-in of the system power source. As a result, it is possible to realize an optical transmission system which is prevented from interference with an optical signal in an adjacent optical wavelength channel and has less transmission error.

What is claimed is:

1. An optical transmission device comprising:
   a current source for outputting a drive current;
   a semiconductor laser for converting the drive current into a stimulated emission light and outputting the same;
   a drive circuit for converting a transmission data signal into a modulation control signal and outputting the same,
   an optical modulator for receiving said stimulated emission light and said modulation control signal and producing and outputting transmission signal light by changing an amount of transmission of said stimulated emission light according to said modulation control signal; and
   a shading element for receiving said transmission signal light and a shading control signal, the shading element for interrupting the transmission of said transmission signal light according to said shading control signal.

2. An optical transmission device according to claim 1, further comprising:
   a temperature detector for detecting a temperature of said semiconductor laser and producing and outputting a temperature detection signal;
   an optical wavelength setting circuit for setting and outputting an optical wavelength setting signal;
   an optical wavelength stabilization circuit for comparing said optical wavelength setting signal with said temperature detection signal thereby generating and outputting an optical wavelength control signal;
   a shading judging circuit for determining a difference between said optical wavelength setting signal and said temperature detection signal thereby generating and outputting a shading judging signal; and
   an operator for receiving a shading setting signal and said shading judging signal thereby generating and outputting a shading control signal.

3. An optical transmission device according to claim 2 wherein said driving current of said current source is controlled by an optical strength control signal and said optical transmission device further comprises:
   a photo detector for detecting an optical strength from a part of said stimulated emission light thereby generating and outputting an optical strength detection signal;
   an optical strength setting circuit for producing and outputting an optical strength setting signal; and
   an optical strength stabilization circuit for comparing said optical strength setting signal with said optical strength detection signal thereby generating and outputting said optical strength control signal.

4. An optical transmission device according to claim 3 further comprising an external control interface circuit for receiving a control logic signal for controlling an optical strength, an optical wavelength and a light shading, an optical wavelength detection signal and an optical strength detection signal and producing an optical wavelength changing signal for controlling the optical wavelength setting signal, an optical strength changing signal for controlling the optical strength setting signal and the shading control signal.

5. An optical transmission device according to claim 2 further comprising an external control interface circuit for receiving a control logic signal for controlling an optical strength, an optical wavelength and a light shading, an optical wavelength detection signal and an optical strength detection signal and producing an optical wavelength changing signal for controlling the optical wavelength setting signal, an optical strength changing signal for controlling the optical strength setting signal and the shading control signal.

6. An optical transmission device according to claim 1 wherein said driving current of said current source is controlled by an optical strength control signal and said optical transmission device further comprises:
   a photo detector for detecting an optical strength from a part of said stimulated emission light thereby generating and outputting an optical strength detection signal;
   an optical strength setting circuit for producing and outputting an optical strength setting signal; and
   an optical strength stabilization circuit for comparing said optical strength setting signal with said optical strength detection signal thereby generating and outputting said optical strength control signal.

7. An optical transmission device according to claim 6 further comprising an external control interface circuit for receiving a control logic signal for controlling an optical strength, an optical wavelength and a light shading, an optical wavelength detection signal and an optical strength detection signal and producing an optical wavelength changing signal for controlling the optical wavelength setting signal, an optical strength changing signal for controlling the optical strength setting signal and the shading control signal.

8. An optical transmission device according to claim 1, further comprising:
   a monitor element for detecting an optical wavelength of a part of said stimulated emission light thereby generating an optical wavelength detection signal and outputting the same to an optical wavelength stabilization circuit and a shading judging circuit;
   an optical wavelength setting circuit for setting and outputting an optical wavelength setting signal;
   said optical wavelength stabilization circuit for comparing said optical wavelength setting signal with said optical wavelength detection signal thereby generating and outputting an optical wavelength control signal;
   said shading judging circuit for determining a difference between said optical wavelength setting signal and said optical wavelength detection signal thereby generating and outputting a shading judging signal; and
   an operator for receiving a shading setting signal and said shading judging signal thereby generating and outputting said shading control signal.

9. An optical transmission device according to claim 8 wherein said driving current of said current source is controlled by an optical strength control signal and said optical transmission device further comprises:
   a photo detector for detecting an optical strength from a part of said stimulated emission light thereby generating and outputting an optical strength detection signal;
   an optical strength setting circuit for producing and outputting an optical strength setting signal; and
   an optical strength stabilization circuit for comparing said optical strength setting signal with said optical strength detection signal thereby generating and outputting said optical strength control signal.

10. An optical transmission device according to claim 9 further comprising an external control interface circuit for receiving a control logic signal for controlling an optical strength, an optical wavelength and a light shading, an optical wavelength detection signal and an optical strength detection signal and producing an optical wavelength changing signal for controlling the optical wavelength setting signal, an optical strength changing signal for controlling the optical strength setting signal and the shading control signal.

11. An optical transmission device according to claim 8 further comprising an external control interface circuit for receiving a control logic signal for controlling an optical strength, an optical wavelength and a light shading, an optical wavelength detection signal and an optical strength detection signal and producing an optical wavelength changing signal for controlling the optical wavelength setting signal, an optical strength changing signal for controlling the optical strength setting signal and the shading control signal.

12. An optical transmission system comprising a plurality of optical transmission devices each for converting a transmission electrical signal into a transmission light signal, a multiplexer for multiplexing a plurality of transmission light signals having different wavelengths thereby generating and producing an optical wavelength division multiplexing light signal, an optical demultiplexer for demultiplexing said optical wavelength division multiplexing light signal into a plurality of receiving light signals having different wavelengths, respectively, and a plurality of optical receivers for converting said receiving light signals into receiving electrical signals, respectively, wherein said optical transmission device comprises:
  a current source for outputting a drive current;
  a semiconductor laser for converting the drive current into a stimulated emission light and outputting the same;
  a drive circuit for converting a transmission data signal into a modulation control signal and outputting the same;
  an optical modulator for receiving said stimulated emission light and said modulation control signal and producing and outputting transmission signal light by changing an amount of transmission of said stimulated emission light according to said modulation control signal; and
  a shading element for receiving said transmission signal light and a shading control signal for interrupting light emission and interrupting the transmission of said transmission signal light according to said shading control signal.

13. An optical transmission system according to claim 12, wherein said optical transmission device further comprises:
  a temperature detector for detecting a temperature of said semiconductor laser and producing and outputting a temperature detection signal;
  an optical wavelength setting circuit for setting and outputting an optical wavelength setting signal;
  an optical wavelength stabilization circuit for comparing said optical wavelength setting signal with said temperature detection signal thereby generating and outputting an optical wavelength control signal;
  a shading judging circuit for judging a difference between said optical wavelength setting signal and said temperature detection signal thereby generating and outputting a shading judging signal; and
  an operator for receiving a shading setting signal and said shading judging signal thereby generating and outputting said shading control signal.

14. An optical transmission system according to claim 13, wherein said optical transmission device further comprises, in place of said temperature detector, a monitor element for detecting an optical wavelength of a part of said stimulated emission light thereby generating an optical wavelength detection signal and outputting the same to said optical wavelength stabilization circuit and said shading judging circuit.

15. An optical transmission device comprising:
  a current source for providing a drive current;
  a semiconductor laser connected to receive the drive current and in response emit stimulated emission light;
  a drive circuit connected to receive a transmission data signal and in response to provide a control signal;
  an optical modulator positioned to receive the stimulated emission light and connected to receive the control signal and in response change transmission of the stimulated emission light thereby generating a transmission light signal a shading element for receiving the transmission signal light and a shading control signal for interrupting the transmission signal light according to the shading control signal; shading element for receiving the transmission signal light and a shading control signal for interrupting the transmission signal light according to the shading control signal;
  a photo detector for detecting the stimulated emission light and in response provide an optical strength detection signal;
  an optical strength setting circuit for producing and outputting an optical strength setting signal; and
  an optical strength stabilization circuit for comparing the optical strength setting signal with the optical strength detection signal and thereby provide the optical strength setting signal.

16. An optical transmission device according to claim 15 further comprising an external control interface circuit for receiving a control logic signal to control an optical strength, an optical wavelength and a light shading, the external control interface circuit further for receiving an optical wavelength detection signal and the optical strength detection signal and for producing an optical wavelength changing signal for controlling an optical wavelength setting circuit, an optical strength changing signal for controlling an optical strength setting circuit and the shading control signal.

* * * * *